UNITED STATES PATENT OFFICE.

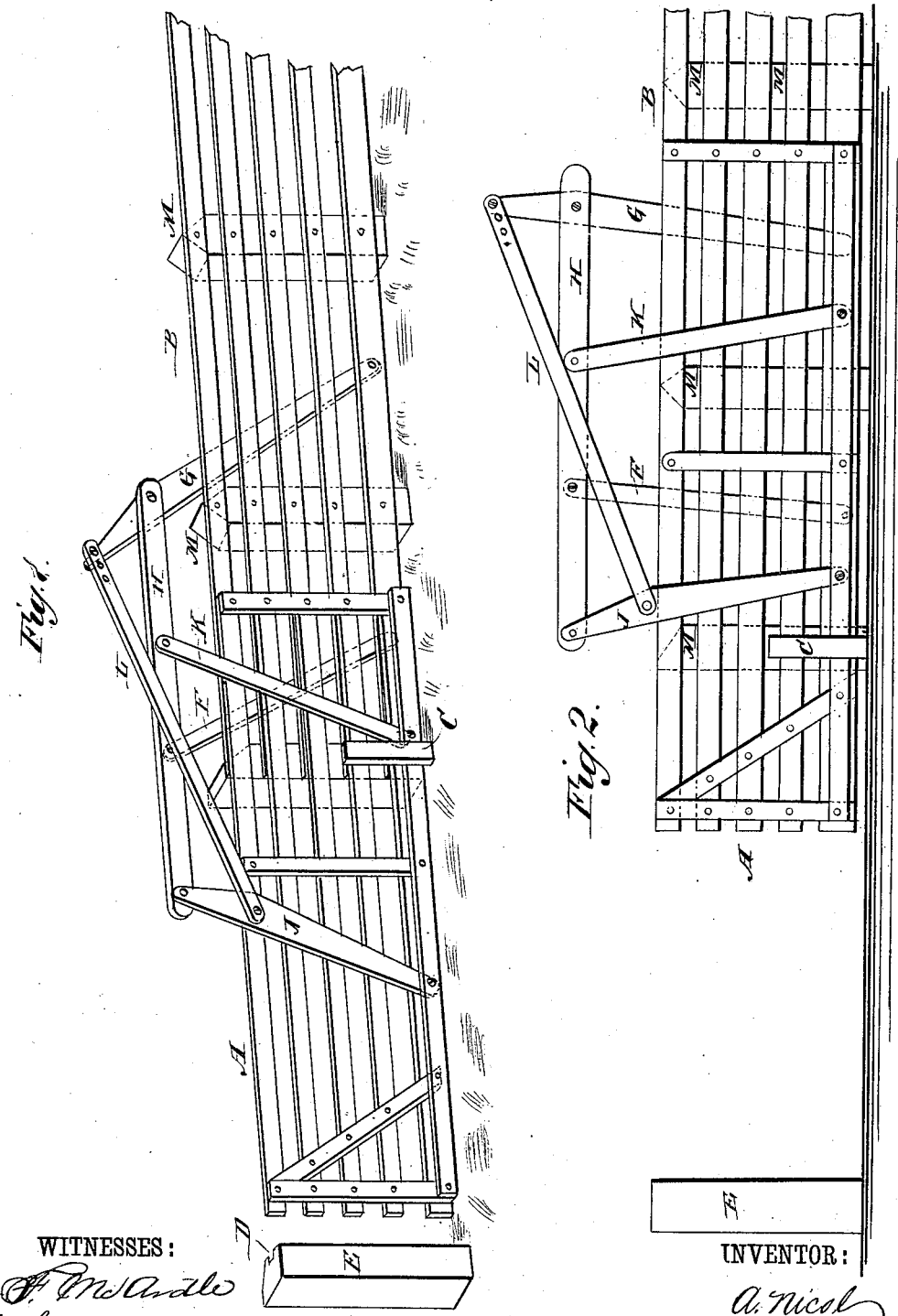

ALEXANDER NICOL, OF AYTON, ONTARIO, ASSIGNOR TO WILLIAM J. WATSON, OF SAME PLACE, AND JAMES NICOL, OF OWEN SOUND, CANADA.

SLIDING GATE.

SPECIFICATION forming part of Letters Patent No. 256,035, dated April 4, 1882.

Application filed December 6, 1881. (Model.) Patented in Canada January 22, 1880.

*To all whom it may concern:*

Be it known that I, ALEXANDER NICOL, of Ayton, in the Province of Ontario and Dominion of Canada, have invented a new and Improved Gate, of which the following is a full, clear, and exact description.

The object of my invention is to provide a new and improved sliding gate which is simple in construction and can be opened and closed without any great exertions.

The invention consists in a gate suspended by rods or bars pivoted to the bottom of the gate and to a longitudinal bar supported by bars pivoted to the bottom of the fence, the inner end bar supporting the longitudinal bar and the outer end bar supporting the gate being connected by a diagonal bar extending down from the top of the innermost supporting-bar, as will be more fully set forth hereinafter.

Reference is to be had to the accompanying drawings, forming a part of this specification, in which similar letters of reference indicate corresponding parts in both the figures.

Figure 1 is a perspective view of my improved gate, showing it almost closed. Fig. 2 is a longitudinal elevation of the same, showing it opened.

The gate A can be made of boards or slats, as may be desired, and is designed to slide parallel with the fence B. To guide the gate in this movement I have provided a guide-post, C, between which and the fence B the gate slides. The outer end of the gate is adapted to fit into a vertical slot, D, in the gate-post E. Two bars, F and G, are pivoted at their lower ends to the bottom of the fence B, the bar G being of greater length than the bar F, as is shown. A longitudinal bar, H, has one end pivoted to the bar G a short distance from the top of this bar G, and this longitudinal bar H is also pivoted to the top of the bar F; but the bar H extends beyond the bar F. A suspension rod or bar, J, is pivoted to the end of the bar H and to the bottom of the gate A in front of the vertical central line of the gate. Another suspension rod or bar, K, is pivoted to the bar H, between the pivots of the bars, F and G, and the lower end of this bar K is also pivoted to the bottom of the gate A. The bars F and G must always be parallel with each other, and the bars J and K must always be parallel with each other. A diagonal or inclined connecting-bar, L, is pivoted to the top of the bar G, and to the bar J, a short distance below its upper end, so that this bar L crosses the longitudinal bar H, as shown.

The operation is as follows: The bar H is supported by the bars F and G and the gate A is suspended from the bar H by the bars J and K; but this would not prevent the gate from resting on the ground and it would be very difficult to move or slide the gate. This is overcome by the diagonal bar L, pivoted to the top of the higher pivoted bar G, and to the bar J a short distance below its upper end, which bar L supports the outer end of the gate. The tops of the fence-posts M are beveled so that the bars F and G can strike against them to prevent the gate from being pushed too far in either direction.

I am aware that it is not new to combine sills, cross-sills, walking-posts, swinging legs, and cross-braces so as to move a gate or door in a horizontal direction without the use of rollers; but

What I claim as new and of my invention is—

1. The combination, with the fence B and gate A, of the bars F and G, pivoted to the bottom of the fence, the bars J and K, pivoted to the bottom of the gate, the bar H, pivoted to the bars F, G, J, and K, and the diagonal bar L, pivoted to the end bars, J and G, substantially as herein shown and described, and for the purpose set forth.

2. The combination, with the gate and the fence B, provided with posts M, having beveled tops, of the bars F G, pivoted to the bottom of the fence, the bars J K, pivoted to the bottom of the gate, the bar H, pivoted to the bars F G J K, and of the diagonal bar L, pivoted to the top of the bar G, and to the bar J, a short distance from the top of the same, substantially as herein shown and described, and for the purpose set forth.

ALEXANDER NICOL.

Witnesses:
ISIDOR KAIN,
JOHN KLEIN.